Patented Apr. 16, 1935

1,998,179

UNITED STATES PATENT OFFICE 1,998,179

PHYSIOLOGICALLY BALANCED SALT MIXTURE

Eduard Julius Wolf, Hamburg, Germany

No Drawing. Application December 22, 1931, Serial No. 582,643. In Germany December 27, 1930

6 Claims. (Cl. 99—11)

The invention relates to physiologically balanced salt mixtures with far reaching compensated cation action which are suitable for the production of organically adequate solutions. The invention further relates to non-hygroscopic salt mixtures and processes for the use of such salt mixtures for the treatment of organic products.

The requirements in salts for the functioning of the living cell are known. It is known that pure salt solutions as inorganic media for cells leads to abnormal conditions as, for example, an increased or reduced permeability of the cell membrane, an alteration of the normal osmotic inner pressure of the cells, electrolytic precipitation of suspension colloids, precipitation, alteration of viscosity, alteration of the surface tension, and swelling and contracting of hydrophylic colloids and the like.

Since time immemorial common salt has been used for the dressing of food. In addition, the housewife frequently employs sodium bicarbonate for the final cooking of leguminous vegetables. The common salt acts as a liquefier by solution of the colloids. It is probably most frequently regarded only as an indispensible flavouring material. The sodium bicarbonate softens the cooking water chemically in that it precipitates the calcium salts. In this manner the flocculation of the proteins contained in the leguminous products is avoided.

It is now, however, also known that the sodium chloride brings about a far reaching alteration of the organic substances. In the cooking of vegetables as, for example, beans, the plant cells are in the course of the action permeable, so that the salt solution penetrates therein and the constituents of the cell contents diffuse outwardly. Some organic products treated with pure salt solutions lose their colour and suffer in flavour and aroma and alter their consistency due to the proteolytic properties of the sodium cations. Meat preserved with salt or vegetables such as beans and the like covered with brine are toughened, lose their fresh taste and their appearance in considerable degree. These facts are already well known, but it was not hitherto known how these difficulties could be overcome. It has already been endeavoured to overcome the unsatisfactory action of pure common salt for example of sodium chloride solution, by adjusting its concentration to correspond with the osmotic pressure in the cell. The physiological common salt solution with about 0,9% sodium chloride is an example of this. However it was immediately noted that the isotonic common salt solution interfered with the functioning of the cell in considerable degree. Further knowledge led to the production of Ringer's solution which as known maintains better functioning of the cell for a longer period.

Ringer's solution consists of about 0,95% NaCl, 0,02% KCl, 0,02% $CaCl_2$ and 0,01–0,1% $NaHCO_3$. The concentration of this solution is, as also in the case of physiological common salt solution, about 0,9%. Also this solution is adjusted to the osmotic pressure.

It has now been found that a particularly good compensation of the cations is obtained with a salt mixture if the cations Na, K, Mg, Ca are present in such proportions that practically it does not alter the surface tension of an electronegative suspension colloid in contradistinction to the addition of a single cation or other proportions of these cations.

The measurement of the surface tension can be carried out in known manner. The lipoid solution may contain for example cholesterin, lecithin and the like.

It has appeared that, for example, a salt mixture of the following composition shows these requirements to the optimum degree.

| | Molecules |
|---|---|
| Sodium | 100 |
| Potassium | 5 |
| Calcium | 2,5 |
| Magnesium | 2,5 |

The molar ratio of sodium to the sum of the other cations (of which the calcium can be replaced by strontium or barium and the potassium by rubidium), is preferably maintained at about 100:10.

A departure from this preferred ratio is permissible in certain cases, the result, however, being less favourable. Thus, the ratio between sodium ions and the sum of the other cations can vary from 100:5 to 100:20, while still giving satisfactory results.

The cations sodium potassium, calcium and magnesium are preferably in the molar proportion of about 40:2:1:1.

As opposed to the known physiological salt solutions, the salt mixture according to the invention is not bound by the limits of osmotic equilibrium with the living substance. That is to say, the solution does not have to be isotonic with the plasma of the organic material treated. Whereas all known physiological salt solutions have a salt concentration of about 0,6 to 0,9%, for the new salt mixture a different zone of action exists with reference to the concentration to be employed. Thus, for example, with the treatment of foodstuffs with a salt solution containing the particular salt in high concentration, for example above 10% up to saturated solution no alteration of the colloidal dispersion of the organic substances is brought about. The dispersion phase of the cell also remains unaffected.

The salt mixture is obtained by mixture of the constituents. The surprising thing is that the mixture does not merely show a combined action of the individual components, but that the action of the individual constituents is partly stopped, while a product with wholly different properties is obtained.

Whereas pure sodium chloride acts in a proteolytic manner and potassium chloride loosens the skin plasma by swelling, the mixture does not show any increased diffusion but, in contradistinction, a practically complete compensation of the individual cation actions.

The salt mixture according to the invention is suitable for therapeutic and biological purposes. It is moreover applicable in other directions in technology.

While pure salt solutions render cells permeable for salts and the like and lead to a diffusion of the liquefied contents, these disadvantages are avoided with the treatment using solutions of the new salt mixture. With the absence of these diffusion and swelling phenomena as well as of colloidal chemical alteration with the use of the salt mixture, none of the disadvantages arise which appear in treatment with pure salt solutions. If vegetables for example are cooked with a solution containing the new salt mixture, they retain a natural colour and preserve also their taste and their fresh flavour and undergo no alteration in their consistency, and moreover, they are not pulped.

The salt mixture according to the invention can be employed also in the household and in vegetable preserving industry in considerable extent and shows, as compared with hitherto employed processes, considerable technical advantages; among others the period of cooking is shortened. As the taste of the salt mixture is not to be distinguished from common salt it serves at the same time as flavouring for the food.

The invention is also suitable for the pickling of meat and the preserving of fish. The soluble part of the meat is not extracted, the meat retains its properties and preserves its flavour and consistency whereas the known pickled meat is pale coloured, tough and of unnatural flavour.

If frozen meat is thawed by immersing same in an aqueous solution of the new salt mixture, then the undesired bleeding of the meat juices is avoided. The same applies to the preservation of fish and the thawing of frozen fish.

The invention, however, is not only suitable for the household or the food industry. The salt mixtures can also be employed with advantage in the fermenting industry, in tanning, in the textile industry and in all other industries in which it is a question of the treatment of animal or vegetable cells without deterioration thereof.

A suitable salt mixture according to the invention is, for example, composed as follows:

| | Grams |
|---|---|
| NaCl | 86.81 |
| KCl | 5.54 |
| $MgCl_2$ | 3.53 |
| $CaCl_2$ | 4.10 |

A salt mixture composed according to this example is hygroscopic, so that it cannot be kept in the solid condition for a long period in the air, and is preferably employed immediately after admixture or in solution. The hygroscopic character can, however, be overcome if in place of the halides of calcium and magnesium, organic salts of both these metals are employed. A non-hygroscopic salt mixture according to the invention can, for example, have the following composition:

| | Grams |
|---|---|
| Sodium chloride | 74.55 |
| Potassium tartrate | 7.47 |
| Magnesium lactate | 8.15 |
| Calcium lactate | 9.78 |

It is a surprising fact that the non-hygroscopic salt mixture according to the example shows the same compensation and the same action as the hygroscopic salt mixture when by varying the remaining ions the balance as regards the colloidal chemical cation action is obtained.

That could not in any way be foreseen. In particular the surprising fact has appeared that the salt mixture according to the invention shows a better and stronger flavouring action than is obtained with the same quantity of common salt.

It seems hardly necessary to state that the salts to be added to the sodium chloride should be non-poisonous, and not harmful to be taken internally.

The uses of the salt mixtures, described herein, are claimed in a copending application 681,665, filed July 21, 1933.

I claim:

1. A physiologically balanced salt mixture which is soluble in water and substantially chemically stable, both hot and cold, and whether dry, wet and dissolved, said mixture containing sodium chloride in preponderating excess over the sum of the other saline constituents, said mixture containing at least one soluble salt of an alkali metal other than sodium and a soluble salt of an alkaline earth metal and a soluble salt of magnesium, said mixture including at least one salt of an organic acid, the cations of said salts being in equilibrium such that the salt mixture has no substantial effect on the surface tension of electronegative colloid solutions, such mixture being sufficiently free from poisonous substances to be edible, and the ratio of sodium to other alkali metal and to alkaline earth metal and magnesium together being about 100:5:5.

2. A physiologically balanced salt mixture, comprising non-poisonous soluble salts with the cations sodium, potassium, magnesium and calcium, said cations being present in the numerical molar proportions respectively of about 40:2:1:1, the molar ratio of sodium to the sum of the other cations being between approximately 100:5 and approximately 100:20, said mixture containing chloride ion in at least an amount which is chemically equivalent to the sodium, and said mixture being substantially free of poisonous substances.

3. A physiologically balanced soluble salt mixture, comprising the cations sodium, potassium, magnesium and calcium, the sodium being in excess over all the others together, and the molar proportion of the cations potassium, calcium and magnesium being approximately 2:1:1, said mixture containing chloride ion in at least an amount which is chemically equivalent to the sodium, and said mixture being substantially free of poisonous substances.

4. A physiologically balanced salt mixture, comprising sodium chloride and a much smaller amount, collectively of a plurality of alkali and alkaline earth metal salts, including soluble organic acid salts, the molar ratio of chloride ions to the organic acid ions being between approximately 100:5 and approximately 100:20, and such mixture being free from poisonous substances.

5. Solid non-hygroscopic salt mixture soluble and free from poisonous compounds, comprising magnesium and calcium, in which the magnesium and calcium are linked to an organic acid, said salt mixture containing NaCl in amount equal to several times the combined amounts of all the other components, and the taste of the entire mixture being similar to that of sodium chloride.

6. Solid non-hygroscopic physiologically balanced salt mixture comprising sodium chloride in excess, and containing soluble potassium, magnesium and calcium salts, said magnesium and calcium salts being salts of lactic acid, and said mixture being free from poisonous compounds, and being edible, such mixture having the taste of the sodium chloride predominating.

EDUARD JULIUS WOLF.